United States Patent
Dufford et al.

(10) Patent No.: US 10,088,316 B2
(45) Date of Patent: Oct. 2, 2018

(54) NAVIGATION SYSTEMS AND VEHICLES FOR PREDICTING ROUTES

(71) Applicant: Toyota Motor Engineering & Manufacturing North America, Inc., Erlanger, KY (US)

(72) Inventors: Mohammad Effendi Dufford, Los Angeles, CA (US); Hiro Yamaguchi, Mission Viejo, CA (US); Takehito Yokoo, Aliso Viejo, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 1210 days.

(21) Appl. No.: 13/687,358

(22) Filed: Nov. 28, 2012

(65) Prior Publication Data

US 2014/0148970 A1     May 29, 2014

(51) Int. Cl.
*G01C 21/00* (2006.01)
*B60L 3/12* (2006.01)
(Continued)

(52) U.S. Cl.
CPC ............. *G01C 21/00* (2013.01); *B60L 3/12* (2013.01); *B60L 11/1861* (2013.01);
(Continued)

(58) Field of Classification Search
CPC ....... G01C 21/00; G01C 21/3617; B60L 3/12; B60L 11/1861; B60L 2240/80; B60L 2240/622; B60L 2240/12; B60L 2250/12; B60L 2260/52; B60L 2260/54; Y02T 90/16; Y02T 10/705; Y02T 10/7005; Y02T 10/7044; Y02T 10/7291; Y02T 90/162; Y02T 90/161
See application file for complete search history.

(56) References Cited

U.S. PATENT DOCUMENTS

| 5,657,226 A | 8/1997 | Shin et al. |
| 6,990,401 B2 | 1/2006 | Neiss et al. |

(Continued)

FOREIGN PATENT DOCUMENTS

| JP | 2010264791 | 11/2010 |
| WO | WO9740398 | 10/1997 |

*Primary Examiner* — Alan D Hutchinson
(74) *Attorney, Agent, or Firm* — Dinsmore & Shohl LLP

(57) ABSTRACT

Navigation systems and vehicles for predicting routes are provided. A navigation system includes one or more processors, a satellite antenna, one or more memory modules, which stores one or more previous location, a segment list, and machine readable instructions. The satellite antenna receives a first signal from one or more global positioning system satellites. When executed by the one or more processors, the machine readable instructions cause the navigation system to transform the first signal into a first location of the navigation system, access the one or more previous locations stored in the one or more memory modules, automatically determine that a turn has occurred based on the first location and the one or more previous locations, store a segment in the segment list after it is determined that the turn has occurred, and predict a route based on the segment list.

18 Claims, 3 Drawing Sheets

(51) Int. Cl.
*B60L 11/18* (2006.01)
*G01C 21/36* (2006.01)

(52) U.S. Cl.
CPC ...... *G01C 21/3617* (2013.01); *B60L 2240/12* (2013.01); *B60L 2240/622* (2013.01); *B60L 2240/80* (2013.01); *B60L 2250/12* (2013.01); *B60L 2260/52* (2013.01); *B60L 2260/54* (2013.01); *Y02T 10/7005* (2013.01); *Y02T 10/705* (2013.01); *Y02T 10/7044* (2013.01); *Y02T 10/7291* (2013.01); *Y02T 90/16* (2013.01); *Y02T 90/161* (2013.01); *Y02T 90/162* (2013.01)

(56) References Cited

U.S. PATENT DOCUMENTS

| | | | |
|---|---|---|---|
| 7,359,718 B2 | 4/2008 | Tao et al. | |
| 7,925,426 B2 | 4/2011 | Koebler et al. | |
| 8,340,898 B2 * | 12/2012 | Currie et al. | 701/409 |
| 2008/0262667 A1 | 10/2008 | Otabe | |
| 2010/0010733 A1 | 1/2010 | Krumm | |
| 2010/0248746 A1 | 9/2010 | Saavedra et al. | |
| 2011/0054768 A1 | 3/2011 | Sullivan | |
| 2011/0172904 A1 | 7/2011 | Dayaratne | |
| 2012/0010767 A1 | 1/2012 | Phillips et al. | |
| 2012/0010768 A1 | 1/2012 | Phillips et al. | |

* cited by examiner

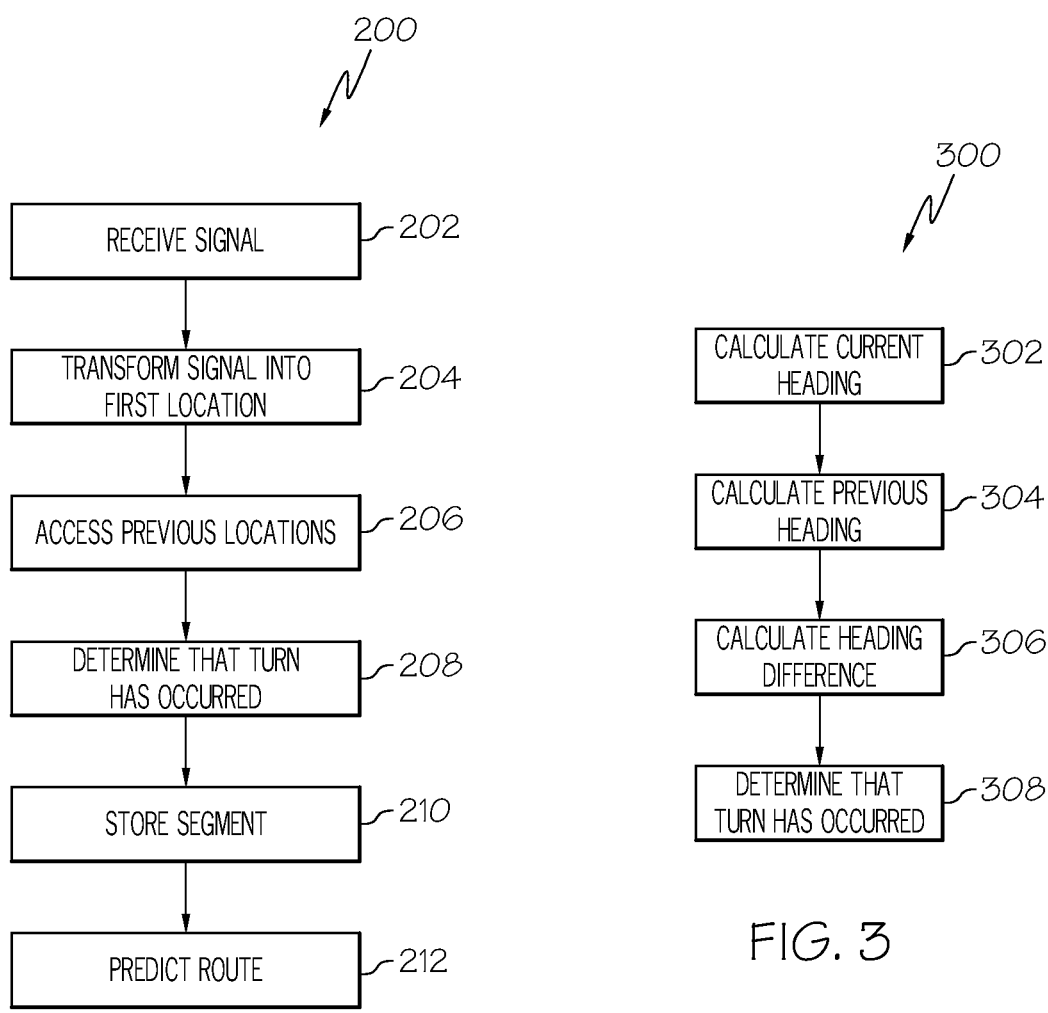

NAVIGATION SYSTEMS AND VEHICLES FOR PREDICTING ROUTES

TECHNICAL FIELD

Embodiments described herein generally relate to navigation systems and vehicles for predicting routes and, more specifically, to navigation systems and vehicles for predicting routes based on turn determination and/or segment identification.

BACKGROUND

Global positioning system (GPS) signals can be utilized for determining a current location of a device capable of receiving GPS signals, such as a navigation system within a vehicle. It may be desirable to predict a route of the vehicle based on simple GPS data (e.g., latitude, longitude, heading, etc.) related to the current location and previous locations that the vehicle has traveled.

Accordingly, a need exists for navigation systems and vehicles for predicting routes.

SUMMARY

In one embodiment, a navigation system for predicting a route includes one or more processors, a satellite antenna communicatively coupled to the one or more processors, one or more memory modules communicatively coupled to the one or more processors, one or more previous locations stored in the one or more memory modules, a segment list stored in the one or more memory modules, and machine readable instructions stored in the one or more memory modules. The satellite antenna receives a first signal from one or more global positioning system satellites. When executed by the one or more processors, the machine readable instructions cause the navigation system to transform the first signal into a first location of the navigation system, access the one or more previous locations stored in the one or more memory modules, automatically determine that a turn has occurred based on the first location and the one or more previous locations, store a segment in the segment list after it is determined that the turn has occurred, and predict a route based on the segment list.

In another embodiment, a navigation system for predicting a route includes one or more processors, a satellite antenna communicatively coupled to the one or more processors, one or more memory modules communicatively coupled to the one or more processors, a segment list stored in the one or more memory modules, and machine readable instructions stored in the one or more memory modules. The satellite antenna receives a second signal from one or more global positioning system satellites. When executed by the one or more processors, the machine readable instructions cause the navigation system to transform the second signal into a second location of the navigation system, identify one or more segment candidates from the segment list, identify one or more route candidates from the route list, calculate a route weight for each identified route candidate, and predict a route. At least one location of each of the one or more segment candidates is within a threshold distance of the second location. Each route candidate includes at least one of the one or more segment candidates. The predicted route is the one or more route candidates with the highest calculated route weight.

In yet another embodiment, a vehicle for predicting a route includes one or more processors, a satellite antenna communicatively coupled to the one or more processors, one or more memory modules communicatively coupled to the one or more processors, one or more previous locations stored in the one or more memory modules, a segment list stored in the one or more memory modules, and machine readable instructions stored in the one or more memory modules. The satellite antenna receives a first signal from one or more global positioning system satellites. When executed by the one or more processors, the machine readable instructions cause the vehicle to transform the first signal into a first location of the vehicle, access the one or more previous locations stored in the one or more memory modules, automatically determine that a turn has occurred based on the first location and the one or more previous locations, store a segment in the segment list after it is determined that the turn has occurred, and predict a route based on the segment list.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 2 schematically depicts a method for predicting a route based on turn determination, according to one or more embodiments shown and described herein;

FIG. 3 schematically depicts a method for determining that a turn has occurred based on a calculated current heading and a calculated previous heading, according to one or more embodiments shown and described herein.

DETAILED DESCRIPTION

The embodiments disclosed herein include navigation systems and vehicles for predicting routes based on turn determination and/or segment identification. Referring generally to FIG. 2, embodiments of the navigation systems and vehicles provided herein transform a first signal received from one or more global positioning system satellites into a first location of the navigation system, access one or more previous locations stored in one or more memory modules, automatically determine that a turn has occurred based on the first location and the one or more previous locations, store a segment in a segment list after it is determined that the turn has occurred, and predict a route based on the segment list. Referring generally to FIG. 3, embodiments of the navigation systems and vehicles provided herein transform a second signal received from one or more global positioning system satellites into a second location of the navigation system, identify one or more segment candidates from a segment list (each of which includes at least one location within a threshold distance of the second location), identify one or more route candidates from the route list (each of which includes at least one of the one or more segment candidates), calculate a route weight for each identified route candidate, and predict a route. The navigation systems and vehicles provided herein may permit a route to be predicted based on turn determination and/or segment identification utilizing simple GPS data. Moreover, the navigations systems and vehicles provided herein may permit a vehicle operating parameter to be adjusted based on the predicted route, which may enhance vehicle performance and operation. The various navigation systems and vehicles for predicting routes based on turn determination and/or segment identification will be described in more detail herein with specific reference to the corresponding drawings.

The embodiments disclosed herein will be described with reference to the terms "location," "segment," and "route." As used herein, "location" means a unique geographic coordinate defined with reference to a coordinate system, such as a geographic location defined by a particular latitude and longitude. As used herein, "segment" means an ordered series of locations, such as a series of locations between turns. As used herein, "route" means an ordered series of segments.

Figure 1:
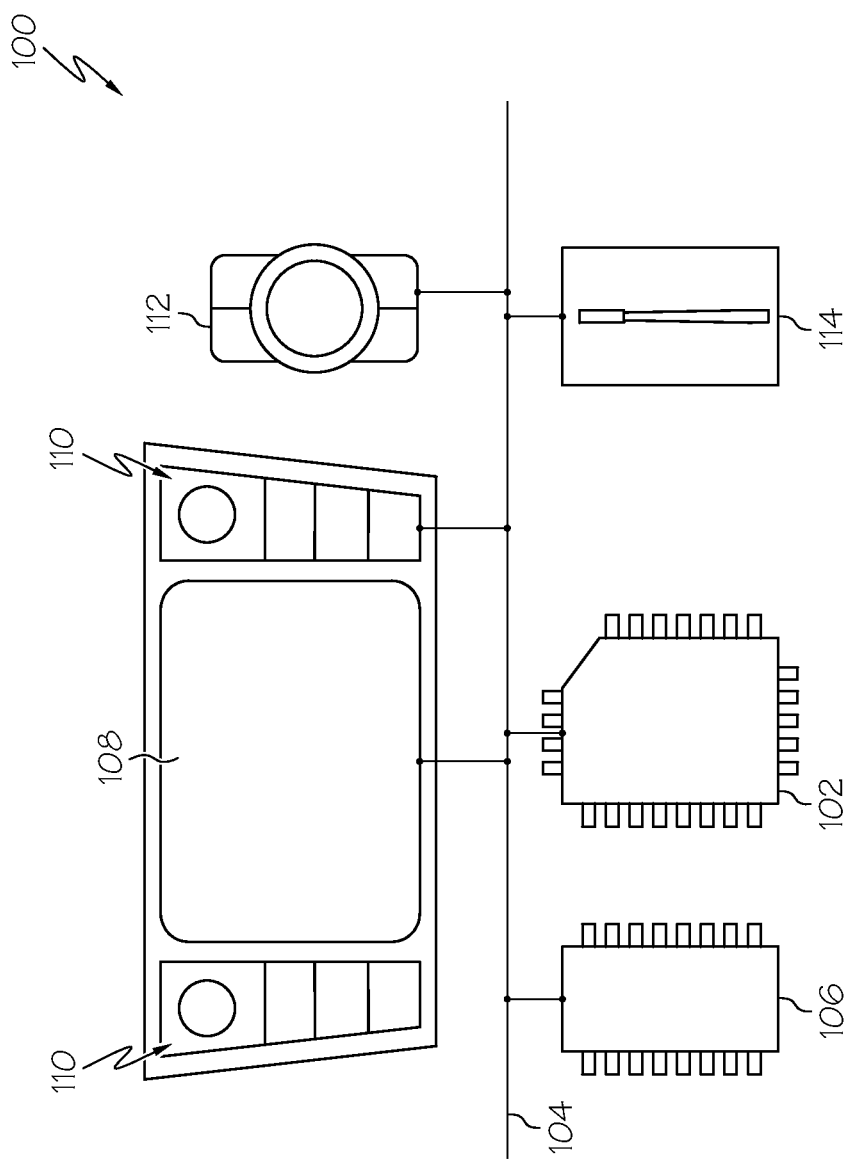
FIG. 1 schematically depicts a navigation system, according to one or more embodiments shown and described herein.

Referring now to FIG. 1, an embodiment of a navigation system 100 is schematically depicted. It is noted that, while the navigation system 100 is depicted in isolation, the navigation system 100 can be coupled to a vehicle (not depicted in the figures). The vehicle may be an automobile or any other passenger or non-passenger vehicle such as, for example, a terrestrial, aquatic, and/or airborne vehicle. The navigation system 100 may be embedded within a mobile device (e.g., smartphone, laptop computer, etc.) carried by a driver of the vehicle.

The navigation system 100 includes one or more processors 102. Each of the one or more processors 102 may be any device capable of executing machine readable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the navigation system. Accordingly, the communication path 104 may communicatively couple any number of processors with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi®, Bluetooth®, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The navigation system 100 includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a static database that includes geographical information pertaining to previously traveled segments and routes and a dynamic database that includes temporal information pertaining to when particular routes and/or segments were traveled. However, it should be understood that other embodiments may not include a static database and/or a dynamic database.

In embodiments that include a static database, the static database generally include a segment list and a route list. The segment list may include a plurality of segments. Each segment of the plurality of segments in the segment list may include a segment identifier, a segment distance, one or more "to" segments, one or more "from" segments, and a plurality of locations. The segment identifier may be a unique identifier that allows a particular segment to be distinguished from other segments. The segment distance may be representative of the total distance of the segment (e.g., the distance from the starting location of the segment to the ending location of the segment, or the sum of the distances between each pair of successive locations in the segment). The one or more "to" segments may include segment identifiers for segments that have been historically traveled immediately after the segment. The one or more "from" segments may include segment identifiers for segments that have been historically traveled immediately before the segment. Each location of the plurality of locations may include location data, such as latitude, longitude, altitude, speed, course, heading, etc. It should be understood that in other embodiments, each segment in the segment list may include more or less information than described. The route list may include a plurality of routes. Each route of the plurality of routes may include a route identifier and an ordered list of segments. The route identifier may be a unique identifier that allows a particular route to be distinguished from other routes. The ordered list of segments may include an ordered list of segment identifiers, where each segment identifier corresponds to a segment stored in the segment list of the static database.

In embodiments that include a dynamic database, the dynamic database generally includes a route history. The route history includes a plurality of route history entries. Each route history entry may include a route identifier and a route occurrence entry for each time the route was travelled. Each route occurrence entry includes a start date, a start time, a day of the week (e.g., Mon-Sun), a time of the day (e.g., AM or PM), and an ordered list of segments. The route identifier typically corresponds to a route stored in the static database. The ordered list of segments may include an ordered list of segment identifiers, where each segment identifier corresponds to a segment stored in the segment list of the static database. Each segment of the ordered list of segments may also include additional information, such as a start time, an end time, a maximum speed, a minimum speed, an average speed, etc. In some embodiments that include a static database and a dynamic database, the static database and dynamic database are stored in XML format, though it will be appreciated that the static database and dynamic database may be stored in any other format.

Referring still to FIG. 1, the navigation system 100 comprises a display 108 for providing visual output such as, for example, maps, navigation, entertainment, information, or a combination thereof. The display 108 is coupled to the communication path 104. Accordingly, the communication path 104 communicatively couples the display 108 to other modules of the navigation system 100. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 108 can include at least one of the one or more processors 102 and the one or memory modules 106. While the navigation system 100 includes a display 108 in the embodiment depicted in FIG. 1, the navigation system 100 may not include a display 108 in other embodiments, such as embodiments in which the navigation system 100 predicts a route based on turn determination and/or segment identification and automatically utilizes the predicted route to optimize a vehicle operating parameter based on the predicted route.

The depicted navigation system 100 comprises tactile input hardware 110 coupled to the communication path 104 such that the communication path 104 communicatively couples the tactile input hardware 110 to other modules of the navigation system 100. The tactile input hardware 110 may be any device capable of transforming mechanical, optical, or electrical signals into a data signal capable of being transmitted with the communication path 104. Specifically, the tactile input hardware 110 may include any number of movable objects that each transform physical motion into a data signal that can be transmitted to over the communication path 104 such as, for example, a button, a switch, a knob, a microphone or the like. In some embodiments, the display 108 and the tactile input hardware 110 are combined as a single module and operate as an audio head unit or an infotainment system. However, it is noted, that the display 108 and the tactile input hardware 110 may be separate from one another and operate as a single module by exchanging signals via the communication path 104. While the navigation system 100 includes tactile input hardware 110 in the embodiment depicted in FIG. 1, the navigation system 100 may not include tactile input hardware 110 in other embodiments, such as embodiments that do not include a display 108.

The navigation system 100 optionally comprises a peripheral tactile input 112 coupled to the communication path 104 such that the communication path 104 communicatively couples the peripheral tactile input 112 to other modules of the navigation system 100. For example, in one embodiment, the peripheral tactile input 112 is located in a vehicle console to provide an additional location for receiving input. The peripheral tactile input 112 operates in a manner substantially similar to the tactile input hardware 110, i.e., the peripheral tactile input 112 includes movable objects and transforms motion of the movable objects into a data signal that may be transmitted over the communication path 104.

The navigation system 100 comprises a satellite antenna 114 coupled to the communication path 104 such that the communication path 104 communicatively couples the satellite antenna 114 to other modules of the navigation system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106

The navigation system 100 can be formed from a plurality of modular units, i.e., the display 108, tactile input hardware 110, the peripheral tactile input 112, and satellite antenna 114, can be formed as modules that when communicatively coupled form the navigation system 100. Accordingly, in some embodiments, each of the modules can include at least one of the one or more processors 102 and/or the one or more memory modules 106. Accordingly, it is noted that, while specific modules may be described herein as including a processor and/or a memory module, the embodiments described herein can be implemented with the processors and memory modules distributed throughout various communicatively coupled modules.

In embodiments where the navigation system 100 is coupled to a vehicle, the one or more processors 102 execute machine readable instructions to transform the global positioning satellite signals received by the satellite antenna 114 into data indicative of the current location of the vehicle.

Referring now to FIG. 2, an embodiment of a method 200 for predicting a route based on turn determination is schematically depicted. In some embodiments, the method 200 may be implemented as logic within the machine readable instructions that, when executed by the one or more processors 102, automatically provide route prediction functions. It is noted that, while the method 200 depicts steps following a specific sequence, additional embodiments of the present disclosure are not limited to any particular sequence.

Referring now to FIGS. 1-2, at step 202, the satellite antenna 114 receives a first signal from one or more global positioning satellites. In some embodiments, the satellite antenna 114 receives an electromagnetic signal with a conductive element. At step 204, the first signal from the one or more global positioning satellites is transformed into a data signal indicative of a first location (e.g., the current location at the time the first signal is received). In one embodiment, the data signal indicative of the first location is capable of being transmitted over the communication path 104. For example, in some embodiments, the satellite antenna 114 may include a chipset that transforms the received electromagnetic signal into a data signal that is transmitted over the communication path 104 and processed by the one or more processors 102. Generally, the data signal indicative of the first location includes a latitude and a longitude. In some embodiments, the data signal indicative of the first location also includes an altitude. In some embodiments, the data signal indicative of the first location may also include a heading and/or a speed, such as when the data signal provided by the chipset includes a heading and/or speed that is associated with the latitude and longitude of the first location. In other embodiments, the data signal indicative of the first location does not include a heading or a speed. In embodiments in which the data signal indicative of the first location does not include a heading or a speed, the navigation system 100 may calculate a heading and/or speed based on previous locations, and associate the calculated heading and/or speed with the first location. In some embodiments, the first location may be modified by further data. For example, the navigation system 100 may include additional sensors (e.g., gyroscopes, accelerometers, or the like) configured to detect the heading and speed of the vehicle. Accordingly, in some embodiments, the first location can be based upon a combination of data including the detected speed, detected heading, detected latitude and longitude, and processing delay.

In some embodiments, the navigation system 100 is coupled to a vehicle (not depicted). In embodiments in which the navigation system 100 is coupled to a vehicle, the data signal includes a latitude and longitude of the vehicle. In other embodiments, the navigation system 100 may be embedded in a mobile device (e.g., a smartphone).

Still referring to FIGS. 1-2, at step 206, the machine readable instructions stored in the one or more memory modules 106, when executed by the one or more processors 102, cause the navigation system 100 to access one or more previous locations stored in the one or more memory modules 106. Prior to the execution of step 206, the one or more previous locations were stored in the one or more memory modules 106. In some embodiments, the navigation system 100 may store a location at regular intervals (e.g., one location is stored every second). In other embodiments, the navigation system 100 may store a location after it is determined that the navigation system 100 has moved a predetermined distance (e.g., one location is stored every 10 m). Each of the one or more previous locations may include a chronological indicator that is indicative of the chronological relation of each previous location with respect to the other previous locations. For example, in some embodiments, each of the one or more previous locations may include a timestamp indicative of a time when the location was recorded. In other embodiments, each of the one or more previous locations may be successively numbered, such that a later-numbered location was received after an earlier-numbered location. One of ordinary skill in the art will appreciate that there are a number of other ways to keep track of the relative order of the one or more previous locations.

Still referring to FIGS. 1-2, at step 208, the machine readable instructions stored in the one or more memory modules 106, when executed by the one or more processors 102, cause the navigation system 100 to determine, automatically, that a turn has occurred based on the first location and the one or more previous locations.

In one embodiment of step 208, the first location and each of the one or more previous locations stored in the one or more memory modules 106 includes a heading. In such an embodiment, the machine readable instructions stored in the one or more memory modules 106, when executed by the one or more processors 102, cause the navigation system 100 to calculate, automatically, a difference between the current heading (the heading associated with the first location) and a previous heading associated with the one or more previous locations. In some embodiments, the heading difference may be calculated by simply subtracting the current heading from the previous heading or subtracting the previous heading from the current heading. In one embodiment, the heading threshold may be 70 degrees. In an embodiment in which the heading threshold is 70 degrees, the navigation system 100 determines that a turn has occurred when the difference in heading between a current heading and a previous heading exceeds 70 degrees. However, it should be understood that in other embodiments the heading threshold may be greater than or less than 70 degrees.

Referring now to FIG. 3, an alternative embodiment of a method 300 that implements step 208 of FIG. 2 is schematically depicted. Referring now to FIGS. 1 and 3, at step 302 the machine readable instructions stored in the one or more memory modules 106, when executed by the one or more processors 102, cause the navigation system 100 to calculate, automatically, a current heading based on the first location. By way of example, but not by way of limitation, a current heading may be calculated based on the first location and one or more previous locations stored in the one or more memory modules 106. In one embodiment, the current heading may be calculated based on the change in latitude and longitude between the first location and the previous location that immediately precedes the first location. In other embodiments, the current heading may be calculated based on the change in latitude and longitude between the first location and one or more previous locations other than the previous location that immediately precedes the first location.

Still referring to FIGS. 1 and 3, at step 304 the machine readable instructions stored in the one or more memory modules 106, when executed by the one or more processors 102, cause the navigation system 100 to calculate, automatically, a previous heading based on a previous location. By way of example, but not by way of limitation, a previous heading may be calculated based on the one or more previous locations stored in the one or more memory modules 106. In one embodiment, the previous heading may be calculated based on the change in latitude and longitude between at least two of the one or more previous locations. In some embodiments, the particular previous locations used to calculate the previous heading may be based on the current speed. For example, the number of locations to look back when calculating the previous heading may be related to the current speed. By way of example, but not by way of limitation, in one embodiment, if the speed is less than 40 km/h, the previous heading may be calculated for the third preceding location (e.g., based on the difference in latitude and longitude between the third preceding location and the fourth preceding location); if the speed is between 40 km/h and 80 km/h, the previous heading may be calculated for the sixth preceding location (e.g., based on the difference in latitude and longitude between the sixth preceding location and the seventh preceding location); and if the speed is greater than 80 km/h, the previous heading may be calculated for the tenth preceding location (e.g., based on the difference in latitude and longitude between the tenth preceding location and the eleventh preceding location). As used herein, the $n^{th}$ "preceding location" means the location that was recorded chronologically n locations before the first location. It should be understood that in other embodiments in which the number of locations to look back when calculating the previous heading is based on the current speed, the ranges of speeds and the number of locations to look back may differ from those set forth in the preceding sentence. Furthermore, while some embodiments utilize the speed to calculate the previous heading, other embodiments calculate the previous heading regardless of the speed.

Still referring to FIGS. 1 and 3, at step 306 the machine readable instructions stored in the one or more memory modules 106, when executed by the one or more processors 102, cause the navigation system 100 to calculate, automatically, a difference between the current heading and the previous heading. In one embodiment, the heading difference may be calculated by simply subtracting the current heading from the previous heading or subtracting the previous heading from the current heading.

Still referring to FIGS. 1 and 3, at step 308 the machine readable instructions stored in the one or more memory modules 106, when executed by the one or more processors 102, cause the navigation system 100 to determine, automatically, that the turn has occurred when the calculated difference exceeds a heading threshold. In one embodiment, the heading threshold may be 70 degrees. In an embodiment in which the heading threshold is 70 degrees, the navigation system 100 determines that a turn has occurred when the difference in heading between a current heading and a previous heading exceeds 70 degrees. It should be understood that in other embodiments the heading threshold may be greater than or less than 70 degrees.

Referring once again to FIGS. 1 and 2, at step 210, the machine readable instructions stored in the one or more memory modules 106, when executed by the one or more processors 102, cause the navigation system 100 to store, automatically, a segment when it is determined that the turn has occurred. The stored segment is typically stored in a segment list of the one or more memory modules 106. The stored segment typically represents the geographic area between detected turns. The stored segment may be stored in the one or more memory modules 106 in a variety of ways. In some embodiments, the stored segment may include a starting location and an ending location. In other embodiments, the stored segment may include one or more locations, such as one or more previous locations. In embodiments that include a static database, the stored segment may be stored in the segment list of the static database if the previous segment does not match an existing segment in the static database, at which time a segment identifier may be associated with the stored segment, a segment distance may be calculated and associated with the stored segment, the "to" segment list of the preceding segment may be updated to include the stored segment, a "from" segment list for the stored segment may be updated to include the previous segment, etc. Furthermore, in embodiments that include a static database, the stored segment may be added to the ordered list of segments of the current route in the route list.

Still referring to FIGS. 1 and 2, at step 212, the machine readable instructions stored in the one or more memory modules 106, when executed by the one or more processors 102, cause the navigation system 100 to predict, automatically, a route based on the segment list. In some embodiments, the route may be predicted at step 212 utilizing the method depicted in FIG. 4, which will be described below. However, it should be understood that, in other embodiments, the route may be predicted at step 212 in other ways than depicted in FIG. 4, such as in ways that do not employ segment identification in order to predict the route.

Figure 4:
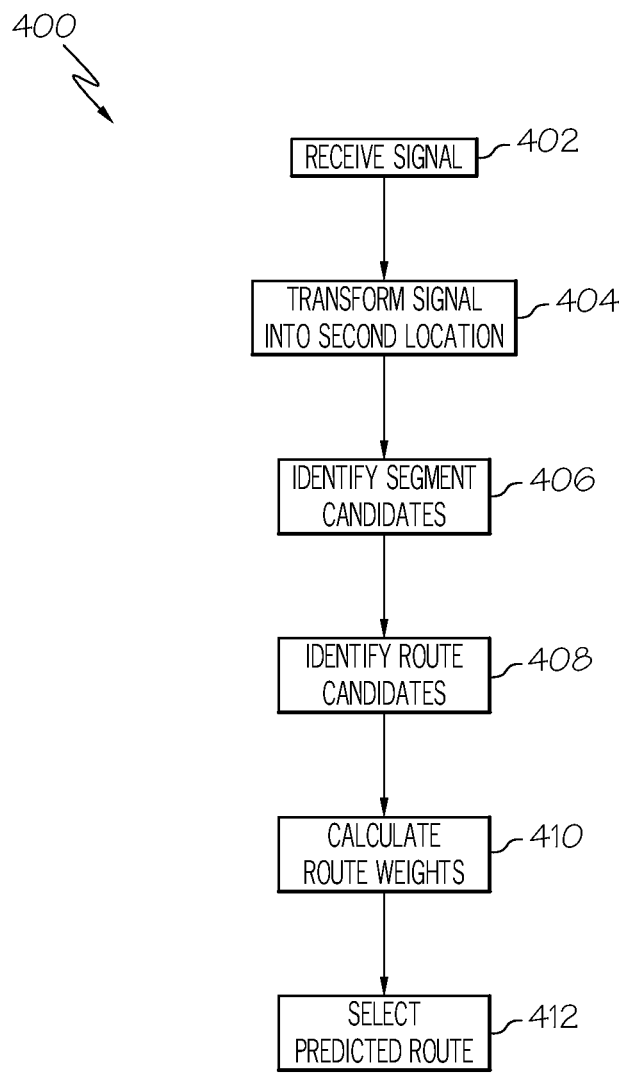
FIG. 4 schematically depicts a method for predicting a route based on segment identification, according to one or more embodiments shown and described herein.

Referring now to FIG. 4, an embodiment of a method 400 for predicting a route based on segment identification is schematically depicted. In some embodiments, the method 400 may be implemented as logic within the machine readable instructions that, when executed by the one or more processors 102, automatically provides route prediction functions. It is noted that, while the method 400 depicts steps following a specific sequence, additional embodiments of the present disclosure are not limited to any particular sequence.

Referring now to FIGS. 1 and 4, at step 402, the satellite antenna 114 receives a second signal from one or more global positioning satellites. In some embodiments, the satellite antenna 114 receives the second signal with a conductive element. At step 404, the second signal from the one or more global positioning satellites is transformed into a data signal indicative of a second location (e.g., the current location at the time the second signal is received). In one embodiment, the data signal indicative of the second location is capable of being transmitted over the communication path 104. For example, in some embodiments, the satellite antenna 114 includes a chipset that transforms the received electromagnetic signal into a data signal that is transmitted over the communication path 104 and processed by the one or more processors 102. Generally, the data signal indicative of the second location includes a latitude and a longitude. In some embodiments, the data signal indicative of the second location includes an altitude. In some embodiments, the data signal indicative of the second location may also include a heading and/or a speed, such as when the data signal provided by the chipset includes a heading and/or speed that is associated with the latitude and longitude of the second location. In other embodiments, the data signal indicative of the second location does not include a heading or a speed.

Still referring to FIGS. 1 and 4, at step 406, the machine readable instructions stored in the one or more memory modules 106, when executed by the one or more processors 102, cause the navigation system 100 to identify, automatically, one or more segment candidates from the segment list. In some embodiments, the one or more segment candidates are identified by accessing the segment list stored in the one or more memory modules 106, determining the distances between the second location and each location of each segment in the segment list, and identifying the one or more segment candidates as those segments of the segment list that have at least one location within a threshold distance from the second location. By identifying the segments having at least one location within the threshold distance from the second location, segments that may match the current location may be identified. For example, in some embodiments the threshold distance may be 60 meters, such that all segments in the segment list having at least one location within 60 meters of the second location are identified. In other embodiments, the threshold distance may differ from 60 meters, such as embodiments in which the threshold distance is 30 meters.

Still referring to FIGS. 1 and 4, at step 408, the machine readable instructions stored in the one or more memory modules 106, when executed by the one or more processors 102, cause the navigation system 100 to identify one or more route candidates from the route list. In some embodiments, the one or more route candidates are identified by accessing the route list stored in the one or more memory modules 106, determining which routes of the route list include any of the one or more segment candidates identified at step 406, and identifying the one or more route candidates as those routes of the route list including at least one of the one or more segment candidates. In some embodiments, steps 406 and 408 may be performed in response to determining that a turn has occurred, such that the one or more route candidates are updated to include additional route candidates that include the segment subsequent to the determined turn.

Still referring to FIGS. 1 and 4, at step 410, the machine readable instructions stored in the one or more memory modules 106, when executed by the one or more processors 102, cause the navigation system 100 to automatically calculate a route weight for each identified candidate route. In some embodiments, the route weight of each identified candidate route may be calculated based on information associated with that route in the dynamic database. For example, in embodiments that include a dynamic database, the route weight for each identified candidate route may be calculated based on the start date, the start time, the day of the week, the time of the day, the ratio of the number of times the identified candidate route was travelled to the total number of times any of the candidate routes were travelled, etc. In some embodiments, the calculated route weight may include multiple components, such as when the calculated route weight includes a day of the week component, a type of day component, and a time of day component. For example, in some embodiments, the route weight may be a combination of a day of the week weight, a type of day weight, and a time of day weight. A day of the week weight may be calculated for a particular candidate route by dividing the total number of times that the candidate route is included in the dynamic database and includes the current day of the week (e.g., Mon-Sun) by the total number of times that candidate route is included in the dynamic database. Similarly, a type of day weight may be calculated for a particular candidate route by dividing the total number of times that the candidate route is included in the dynamic database and includes the current type of day (e.g., weekend day vs. weekday) by the total number of times that candidate route is included in the dynamic database. Similarly, a time of day weight may be calculated for a particular candidate route by dividing the total number of times that the candidate route is included in the dynamic database and includes the current time of day (e.g., AM vs. PM) by the total number of times that the candidate route is included in the dynamic database. It should be understood that in other embodiments, the route weight may be calculated based on parameters other than, or in addition to, the day of the week, the type of day, and the time of day.

Still referring to FIGS. 1 and 4, at step 412, the machine readable instructions stored in the one or more memory modules 106, when executed by the one or more processors 102, cause the navigation system 100 to predict a route by selecting one of the one or more candidate routes. In some embodiments, the selected route is the candidate route with the highest calculated route weight. However, it should be understood that, in other embodiments, the predicted route may have a lower calculated route weight than at least one of the other candidate routes.

In some embodiments, the list of candidate routes and/or the list of candidate segments may be updated based on the current location of the navigation system. For example, in some embodiments, the machine readable instructions stored in the one or more memory modules 106, when executed by the one or more processors 102, cause the navigation system 100 to transform a third signal received from the one or more global positioning satellites into a third location, remove at least one segment from the one or more segment candidates when no location of the removed segment is within the threshold distance of the third location, and remove at least one route candidate from the one or more route candidates, wherein the removed route candidate includes the removed segment. By updating the list of candidate routes to remove routes that are no longer candidates, as the navigation system 100 moves, the accuracy of the predicted route may be enhanced.

In some embodiments, after a route is predicted, a vehicle operating parameter (e.g., a battery state of charge, a hybrid vehicle mode, a transmission gear, etc.) may be adjusted based on the predicted route. In such embodiments, a powertrain control module may be communicatively coupled to the one or more processors 102 and may adjust the vehicle operating parameter. In one embodiment in which a vehicle is a hybrid electric vehicle, the battery state of charge may be adjusted based on the predicted route or the hybrid vehicle may enter electric vehicle mode based on the predicted route. In embodiments in which a vehicle operating parameter is adjusted based on the predicted route, the vehicle operating parameter may be adjusted only when a calculated route confidence level exceeds a confidence threshold, which may avoid potential degradation in vehicle performance if an incorrect route is predicted.

In some embodiments, after a route is predicted, a graphical indication of the predicted route may be automatically presented on the display 108. In one embodiment, the navigation system 100 may receive input from a driver or passenger that is indicative of a confirmation that the predicted route is correct via input hardware, which may include a touch screen, the tactile input hardware 110, the peripheral tactile input 112, or the like. In response to receiving input indicative of a confirmation that the predicted route is correct, the navigation system 100 may adjust a vehicle operating parameter.

Upon determining that a trip has ended, some embodiments determine whether the current route matches any route of the one or more candidate routes. Some embodiments determine whether the current location is within a predefined distance (e.g., 10 meters, 30 meters, 60 meters, 100 meters, etc.) of the last location of each of the one or more candidate routes and whether the ordered list of segments of the current route matches the ordered list of segments of each of the one or more candidate routes. When the current location is within a predefined distance of the last location of a matched route and the ordered list of segments of the current route matches the ordered list of segments of the matched route, the existing route history entry of the matched route is updated to include a new route occurrence entry and associated data (e.g., a start date, a start time, a day of the week, a time of the day, and an ordered list of segments). In some embodiments, when the current location is within a predefined distance of the last location of a matched route, but the ordered list of segments of the current route does not exactly match the ordered list of segments of the matched route, the existing route history entry of the matched route is updated to include a new route occurrence entry and associated data if the total driving distance of the matched route differs from the total distance of the current route by less than a predefined amount (e.g., 100 meters). When either the current location is not within a predefined distance of the last location of any of the one or more candidate routes or the ordered list of segments of the current route does not match the ordered list of segments of any of the one or more candidate routes and the total driving distance differs by more than a certain amount, a new route history entry (and new route occurrence entry) may be stored in the one or more memory modules 106.

It should be understood that embodiments described herein provide for navigation systems and vehicles for predicting routes based on turn determination and/or segment identification. The navigation systems and vehicles provided herein may permit a route to be predicted based on turn determination and/or segment identification utilizing simple GPS data. Moreover, the navigations systems and vehicles provided herein may permit a vehicle operating parameter to be adjusted based on the predicted route, which may enhance vehicle performance and operation.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A navigation system for predicting a route comprising:
   one or more processors;
   a satellite antenna communicatively coupled to the one or more processors, wherein the satellite antenna receives a first signal from one or more global positioning system satellites;
   one or more memory modules communicatively coupled to the one or more processors;
   one or more previous locations stored in the one or more memory modules;
   a segment list stored in the one or more memory modules; and
   machine readable instructions stored in the one or more memory modules that cause the navigation system to perform at least the following when executed by the one or more processors:
       transform the first signal into a first location of the navigation system;
       access the one or more previous locations stored in the one or more memory modules;
       calculate a first heading based on the first location;
       calculate a previous heading based on the one or more previous locations;
       calculate a difference between the first heading and the previous heading;
       determine, automatically, that a turn has occurred based on the first location and the one or more previous locations when the calculated difference exceeds a heading threshold;
       store a segment in the segment list after it is determined that the turn has occurred; and
       predict a route based on the segment list.

2. The navigation system of claim 1, further comprising a route list stored in the one or more memory modules, wherein the machine readable instructions stored in the one or more memory modules further cause the navigation system to perform at least the following when executed by the one or more processors:
   transform a second signal received from the one or more global positioning satellites with the satellite antenna into a second location;
   identify one or more segment candidates from the segment list, wherein at least one location of each of the one or more segment candidates is within a threshold distance of the second location;
   identify one or more route candidates from the route list, wherein each route candidate includes at least one of the one or more segment candidates; and
   select the predicted route from the one or more route candidates.

3. The navigation system of claim 2, wherein the machine readable instructions stored in the one or more memory modules further cause the navigation system to perform at least the following when executed by the one or more processors:
   calculate a route weight for each identified route candidate.

4. The navigation system of claim 3, wherein the route weight is based on a start date, a start time, a day of the week, a time of the day, a ratio of the number of times the identified candidate route was travelled to a total number of times any of the candidate routes were travelled.

5. The navigation system of claim 3, wherein the predicted route is the route candidate with the highest calculated route weight.

6. The navigation system of claim 2, wherein the machine readable instructions stored in the one or more memory modules further cause the navigation system to perform at least the following when executed by the one or more processors:
   transform a third signal received from the one or more global positioning satellites with the satellite antenna into a third location;
   remove at least one segment from the one or more segment candidates, wherein no location of the removed segment is within the threshold distance of the third location; and
   remove at least one route candidate from the one or more route candidates, wherein the removed route candidate includes the removed segment.

7. The navigation system of claim 1, wherein the stored segment includes a starting location of the stored segment and an ending location of the stored segment.

8. The navigation system of claim 1, wherein the stored segment includes a plurality of locations, and wherein the plurality of locations includes the one or more previous locations.

9. The navigation system of claim 1, wherein the machine readable instructions stored in the one or more memory modules further cause the navigation system to perform at least the following when executed by the one or more processors:
   adjust a vehicle operating parameter based on the predicted route.

10. The navigation system of claim 9, wherein the vehicle operating parameter is battery state of charge.

11. The navigation system of claim 9, wherein the machine readable instructions stored in the one or more memory modules further cause the navigation system to perform at least the following when executed by the one or more processors:
    calculate a route prediction confidence level, wherein the vehicle operating parameter is only adjusted when the route prediction confidence level exceeds a confidence threshold.

12. A navigation system for predicting a route comprising:
    one or more processors;
    a satellite antenna communicatively coupled to the one or more processors, wherein the satellite antenna receives a second signal from one or more global positioning system satellites;

one or more memory modules communicatively coupled to the one or more processors;

a segment list stored in the one or more memory modules; and machine readable instructions stored in the one or more memory modules that cause the navigation system to perform at least the following when executed by the one or more processors:

transform the second signal into a second location of the navigation system;

identify, automatically, one or more segment candidates from the segment list, wherein at least one location of each of the one or more segment candidates is within a threshold distance of the second location;

identify one or more route candidates from a route list, wherein each route candidate includes at least one of the one or more segment candidates;

calculate a route weight for each identified route candidate; and predict a route, wherein the predicted route is the one or more route candidates with the highest calculated route weight.

13. The navigation system of claim 12, wherein the machine readable instructions stored in the one or more memory modules further cause the navigation system to perform at least the following when executed by the one or more processors:

transform a third signal received from the one or more global positioning satellites with the satellite antenna into a third location;

remove at least one segment from the one or more segment candidates, wherein no location of the removed segment is within the threshold distance of the third location; and remove at least one route candidate from the one or more route candidates, wherein the removed route candidate includes the removed segment.

14. The navigation system of claim 12, wherein the route weight is based on a start date, a start time, a day of the week, a time of the day, a ratio of the number of times the identified candidate route was travelled to a total number of times any of the candidate routes were travelled.

15. The navigation system of claim 12, wherein the machine readable instructions stored in the one or more memory modules further cause the navigation system to perform at least the following when executed by the one or more processors:

adjust a vehicle operating parameter based on the predicted route.

16. The navigation system of claim 15, wherein the vehicle operating parameter is battery state of charge.

17. The navigation system of claim 15, wherein the machine readable instructions stored in the one or more memory modules further cause the navigation system to perform at least the following when executed by the one or more processors:

calculate a route prediction confidence level, wherein the vehicle operating parameter is only adjusted when the route prediction confidence level exceeds a confidence threshold.

18. A vehicle for predicting a route comprising:

one or more processors;

a satellite antenna communicatively coupled to the one or more processors, wherein the satellite antenna receives a first signal from one or more global positioning system satellites;

one or more memory modules communicatively coupled to the one or more processors;

one or more previous locations stored in the one or more memory modules;

a segment list stored in the one or more memory modules;

a route list stored in the one or more memory modules; and machine readable instructions stored in the one or more memory modules that cause the vehicle to perform at least the following when executed by the one or more processors:

transform the first signal into a first location of the vehicle;

access the one or more previous locations stored in the one or more memory modules;

determine, automatically, that a turn has occurred based on the first location and the one or more previous locations;

store a segment in the segment list after it is determined that the turn has occurred;

predict a route based on the segment list;

transform a second signal received from the one or more global positioning satellites with the satellite antenna into a second location;

identify one or more segment candidates from the segment list, wherein at least one location of each of the one or more segment candidates is within a threshold distance of the second location;

identify one or more route candidates from the route list, wherein each route candidate includes at least one of the one or more segment candidates; and select the predicted route from the one or more route candidates.

* * * * *